(12) United States Patent
Geraci et al.

(10) Patent No.: US 12,417,344 B2
(45) Date of Patent: Sep. 16, 2025

(54) TRAINING RECOMMENDATION MODEL BASED ON TOPIC MODEL AND WORD IMPORTANCE

(71) Applicant: Samsung Electronics Co., Ltd., Suwon-si (KR)

(72) Inventors: James Russell Geraci, Suwon-si (KR); Francisco Pena, Dublin (IE); Aonghus Lawlor, Dublin (IE); Barry Smyth, Dublin (IE); Ilias Tragos, Dublin (IE); Neil Hurley, Dublin (IE)

(73) Assignee: Samsung Electronics Co., Ltd., Suwon-si (KR)

( * ) Notice: Subject to any disclaimer, the term of this patent is extended or adjusted under 35 U.S.C. 154(b) by 427 days.

(21) Appl. No.: 17/296,821

(22) PCT Filed: May 20, 2021

(86) PCT No.: PCT/KR2021/095039
§ 371 (c)(1),
(2) Date: Apr. 5, 2023

(87) PCT Pub. No.: WO2021/242073
PCT Pub. Date: Dec. 2, 2021

(65) Prior Publication Data
US 2023/0259703 A1    Aug. 17, 2023

(30) Foreign Application Priority Data

May 29, 2020    (KR) .................. 10-2020-0065387
Mar. 30, 2021   (KR) .................. 10-2021-0041217

(51) Int. Cl.
*G06F 40/30*     (2020.01)
*G06F 17/16*     (2006.01)
(Continued)

(52) U.S. Cl.
CPC .......... *G06F 40/216* (2020.01); *G06F 40/284* (2020.01)

(58) Field of Classification Search
CPC ............. G06F 16/3334; G06F 16/3335; G06F 16/335; G06F 16/9535; G06F 40/279;
(Continued)

(56) References Cited

U.S. PATENT DOCUMENTS 6,981,040 B1 * 12/2005 Konig ................. G06F 16/9535
8,356,044 B2 *  1/2013 Stefik ..................... G06Q 10/10
                                                                707/758
(Continued)

FOREIGN PATENT DOCUMENTS

JP         5683758 B1    3/2015
JP     2019-049980 A     3/2019
(Continued)

OTHER PUBLICATIONS

Peña et al., "Combining Rating and Review Data by Initializing Latent Factor Models with Topic Models for Top-N Recommendation", Fourteenth ACM Conference on Recommender ACM Conference on Recommender Systems (RecSys '20), Sep. 22-26, 2020, 6 pages. (Year: 2020).*
(Continued)

*Primary Examiner* — Martin Lerner
(74) *Attorney, Agent, or Firm* — Jefferson IP Law, LLP

(57) ABSTRACT

An electronic device and a controlling method thereof are provided. The electronic device includes a memory and a processor configured to obtain importance data representing an importance of each of a plurality of words included in the text data using text data related to a plurality of items written by a plurality of users, obtain a topic model representing a relationship between a topic and a word by applying a topic modelling algorithm to the obtained importance data, obtain
(Continued)

preference data representing preference of each of the plurality of users for the topic and relationship data representing a relationship between the plurality of items and the topic, based on the obtained topic model, and train a recommendation model to output result data including an estimated preference for the plurality of items of the plurality of users, based on the preference data and the relationship data.

11 Claims, 5 Drawing Sheets

(51) Int. Cl.
  *G06F 40/216* (2020.01)
  *G06F 40/284* (2020.01)
  *G06N 3/08* (2023.01)

(58) Field of Classification Search
  CPC ........ G06F 40/284; G06F 40/30; G06F 40/35; G06F 17/16; G06N 3/08
  USPC ............ 704/1, 9; 707/730, 732, 750; 706/12
  See application file for complete search history.

(56) References Cited

U.S. PATENT DOCUMENTS

| | | | |
|---|---|---|---|
| 8,463,662 B2 | 6/2013 | Koren et al. | |
| 9,454,528 B2 | 9/2016 | St. Jacques, Jr. et al. | |
| 9,477,777 B2* | 10/2016 | Stankiewicz | G06F 16/355 |
| 9,552,555 B1* | 1/2017 | Yee | G06F 16/335 |
| 10,332,015 B2 | 6/2019 | Kawale et al. | |
| 10,552,843 B1 | 2/2020 | Podgorny et al. | |
| 10,614,365 B2 | 4/2020 | Sathish et al. | |
| 10,963,941 B2 | 3/2021 | Garcia Duran et al. | |
| 2007/0162272 A1* | 7/2007 | Koshinaka | G06F 40/30 704/9 |
| 2013/0325942 A1* | 12/2013 | Chen | G06Q 10/10 709/204 |
| 2015/0262069 A1* | 9/2015 | Gabriel | G06F 16/9535 706/48 |
| 2015/0379610 A1 | 12/2015 | Stankiewicz et al. | |
| 2016/0034483 A1* | 2/2016 | Ge | G06F 16/3334 706/52 |
| 2016/0041985 A1* | 2/2016 | Manterach | G06F 16/9535 707/727 |
| 2017/0091171 A1* | 3/2017 | Perez | G06F 40/35 |
| 2017/0161628 A1* | 6/2017 | Chiba | G06F 40/103 |
| 2018/0075137 A1* | 3/2018 | Lifar | G06F 16/337 |
| 2018/0158164 A1* | 6/2018 | Srivastava | G06N 20/00 |
| 2019/0080383 A1 | 3/2019 | Garcia Duran et al. | |
| 2019/0180321 A1* | 6/2019 | Shen | G06F 40/284 |
| 2019/0197121 A1* | 6/2019 | Jeon | G06F 40/30 |
| 2020/0311114 A1* | 10/2020 | Sood | G06F 16/355 |
| 2020/0349393 A1* | 11/2020 | Zhong | G06N 3/045 |
| 2021/0089884 A1* | 3/2021 | Macready | G06N 3/045 |

FOREIGN PATENT DOCUMENTS

| | | |
|---|---|---|
| KR | 10-2013-0092310 A | 8/2013 |
| KR | 10-2019-0103505 A | 9/2019 |
| KR | 10-2020-0027089 A | 3/2020 |

OTHER PUBLICATIONS

International Search Report dated Aug. 30, 2021, issued in International Patent Application No. PCT/ KR2021/095039.

* cited by examiner

TRAINING RECOMMENDATION MODEL BASED ON TOPIC MODEL AND WORD IMPORTANCE

TECHNICAL FIELD

This disclosure relates to an electronic device and a method for controlling the electronic device. More particularly, the disclosure relates to an electronic device for providing a user with item recommendation information using an artificial intelligence (AI) system and a method for controlling thereof.

BACKGROUND ART

Recently, an algorithm for improving sound quality of speech based on an artificial intelligence (AI) system has been developed. The AI system refers to a system that performs learning and inference based on a neural network model unlike a related-art rule-based system, and is utilized in various ranges such as speech recognition, image recognition, future prediction, and the like.

An AI system for solving a problem through a deep neural network based on deep learning has been developed. For example, an AI system for recommending a particular item to a user based on numerical ratings assigned to various items by a user or implicit interaction has been developed and utilized.

In order to train an AI system using both the numerical ratings and an implicit interaction assigned to various types of items, there is a limitation in that a large amount of learning data and learning time are required, and complexity for learning is also increased exponentially.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device providing a user with item recommendation information based on review text data for an item and a controlling method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a memory and a processor configured to obtain importance data representing an importance of each of a plurality of words included in the text data using text data related to a plurality of items written by a plurality of users, obtain a topic model representing a relationship between a topic and a word by applying a topic modelling algorithm to the obtained importance data, obtain preference data representing preference of each of the plurality of users for the topic and relationship data representing a relationship between the plurality of items and the topic, based on the obtained topic model, and train a recommendation model to output result data including an estimated preference for the plurality of items of the plurality of users based on the preference data and the relationship data.

In accordance with another aspect of the disclosure, a controlling method of an electronic device is provided. The method includes obtaining importance data representing an importance of each of a plurality of words included in the text data using text data related to a plurality of items written by a plurality of users, obtaining a topic model representing a relationship between a topic and a word by applying a topic modelling algorithm to the obtained importance data, obtaining preference data representing preference of each of the plurality of users for the topic and relationship data representing a relationship between the plurality of items and the topic, based on the obtained topic model, and training a recommendation model to output result data including an estimated preference for the plurality of items of the plurality of users based on the preference data and the relationship data.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

BEST MODE FOR CARRYING OUT THE DISCLOSURE

Figure 1:
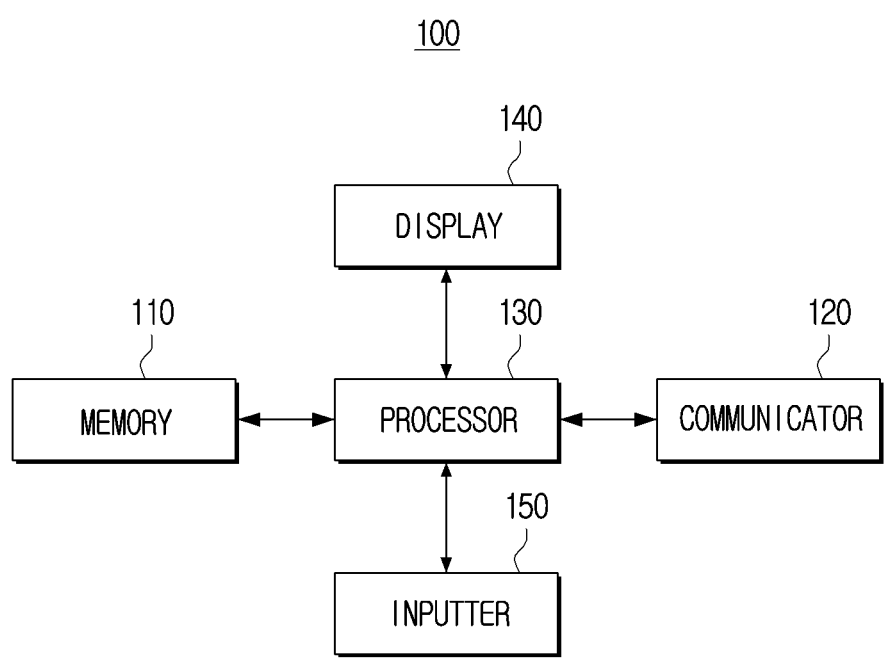
FIG. 1 is a block diagram briefly illustrating a configuration of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, like reference numerals indicate like components that perform substantially the same functions throughout the disclosure. For convenience of descriptions and understanding, the same reference numerals or symbols are used and described in different example embodiments. In other words, although elements having the same reference numerals are all illustrated in a plurality of drawings, the plurality of drawings do not refer to one embodiment.

Accordingly, the technical concept of the disclosure is not limited by a relative size or spacing drawn in the accompanying drawings.

The terms such as "first," "second," and so on may be used to describe a variety of elements, but the elements should not be limited by these terms. The terms are used for the purpose of distinguishing one element from another. For example, the elements associated with the ordinal numbers should not be limited in order or order of use by the numbers. If necessary, the ordinal numbers may be replaced with each other.

A singular expression includes a plural expression, unless otherwise specified. It is to be understood that the terms such as "comprise" may, for example, be used to designate a presence of a characteristic, number, operation, element, component, or a combination thereof, and not to preclude a presence or a possibility of adding one or more of other characteristics, numbers, operations, elements, components or a combination thereof.

The expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

The term such as "module," "unit," "part," and so on is used to refer to an element that performs at least one function or operation, and such element may be implemented as hardware or software, or a combination of hardware and software. Further, except for when each of a plurality of "modules," "units," "parts," and the like need to be implemented in an individual hardware, the components may be integrated in at least one module or chip and implemented in at least one processor.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and the another element.

In this disclosure, a term user may refer to a person using an electronic device or a device (for example: artificial intelligence (AI) electronic device) that uses an electronic device.

Hereinafter, embodiments of the disclosure will be described below with reference to the accompanying drawings.

FIG. 1 is a block diagram briefly illustrating a configuration of an electronic device according to an embodiment of the disclosure.

Referring to FIG. 1, an electronic device 100 may include a memory 110, a communicator 120, a processor 130, a display 140, and an inputter 150.

The configuration of FIG. 1 is merely to implement embodiments of the disclosure, and hardware and software configurations which are obvious to those skilled in the art may be additionally included in the electronic device 100.

The electronic device 100 may include at least one of, for example, smartphones, tablet personal computer (PC) s, desktop PCs, laptop PCs, netbook computers, workstations, medical devices, cameras or a wearable device. The embodiment is not limited thereto, and the electronic device 100 may be implemented with various types of devices such as a display device, a refrigerator, an air-conditioner, a cleaner, or the like.

The memory 110 may store data or at least one instruction related to at least one other component of the electronic device 100. The instruction refers to one action statement that the processor 130 may execute directly in a programming language, and is a minimum unit for the execution or operation of a program. The memory 110 may be accessed by the processor 130, and read/write/modify/update, etc. of data by the processor 130 may be performed.

A term memory may be implemented as a memory 110, a read-only memory (ROM, not shown) or a random access memory (RAM, not shown) in the processor 130, or a memory separated from the processor 130. The memory 110 may be implemented as a memory embedded in the electronic device 100, or may be implemented as a detachable memory in the electronic device 100, according to the data usage purpose. For example, data for driving the electronic device 100 may be stored in a memory embedded in the electronic device 100, and data for an additional function of the electronic device 100 may be stored in the memory detachable to the electronic device 100.

The memory 110 may be implemented as a memory embedded in the electronic device 100, or may be implemented as a detachable memory in the electronic device 100, according to the data usage purpose. For example, data for driving the electronic device 100 may be stored in a memory embedded in the electronic device 100, and data for an additional function of the electronic device 100 may be stored in the memory detachable to the electronic device 100.

Data required to perform various operations may be stored in the memory 110. A recommendation model (or a matrix factorization model) refers to an AI model trained to output an expected preference for each of a plurality of items of a user.

The recommendation model may output an expected preference for a particular item of the user using a pre-learned matrix decomposition algorithm. The expected preference may mean a preference value expected to be given to the item based on at least one of the features related to the user or features associated with the item.

The matrix decomposition algorithm is an algorithm for decomposing a sparse matrix including some preference for each of a plurality of items of a user into a first latent factor and a second latent factor, and training so that a result value of the computation between the decomposed first latent factor and the second latent factor is to be the same as a matrix including the actual user's preference.

The memory 110 may store result data including an estimated preference for a plurality of items of a plurality of users output through a recommendation model.

The communicator 120 may communicate with an external device. Communication of the communicator 120 with an external device and an external server may include communication through a third device (e.g., a relay, a hub, an access point, a gateway, etc.).

The communicator 120 may include various communication modules to perform communication with an external device. For example, the communicator 120 may include a wireless communication module, for example, may include cellular communication using any one of the following, for example, long-term evolution (LTE), LTE advanced (LTE-A), a code division multiple access (CDMA), a wideband CDMA (WCDMA), and a universal mobile telecommunications system (UMTS), a wireless broadband (WiBro), or a global system for mobile communications (GSM), 5th generation (5G), and the like.

According to another embodiment, the wireless communication may include, for example, any one or any combination of wireless fidelity (Wi-Fi), Bluetooth, Bluetooth low energy (BLE), or Zigbee.

The communicator 120 may receive a preference value (e.g., an evaluation score, etc.) for an item inputted by a user from an external device. As another example, the communicator 120 may receive text data (e.g., review text data for an item, etc.) associated with the item written by the user.

The processor 130 may be electrically connected with the memory 110 and control overall operations and functions of the electronic device 100. At this time, one or a plurality of processors may be a general purpose processor, such as a central processing unit (CPU), an application processor (AP), or the like, a graphics-only processor such as graphics processing unit (GPU), visual processing unit (VPU), and the like, or an AI-dedicated processor such as neural network processing unit (NPU). If one or a plurality of processors are AI-dedicated processors, the AI-dedicated processors may be designed with a hardware structure specialized in processing of a specific AI model.

The processor 130 may be implemented as a system on chip (SoC), a large scale integration (LSI), or a field programmable gate array (FPGA). The processor 130 may perform various functions by executing computer executable instructions stored in a memory to be described later.

The processor 130 may receive, from at least one external device, text data associated with the item (or review text data for a plurality of items) or the numerical ratings through the communicator 120.

The processor 130 may obtain importance data representing an importance of each of a plurality of words included in the text data by using text data related to a plurality of items written by the plurality of users.

The processor 130 may identify a word that is a noun included in the text data associated with the plurality of items. The processor 130 may identify only words of which a word class is noun, among a plurality of words included in the text data.

The processor 130 may generate a bag of words (BOW) including the identified word that is a noun. The BOW means a word representation model that considers only the appearance frequency of the word without considering the arrangement order.

The processor 130 may obtain importance data based on the generated BOW. For example, the processor 130 may obtain importance data by applying a term frequency-inverse document frequency (TF-IDF) algorithm to the generated BOW. TF-IDF. The TF-IDF algorithm means a statistical algorithm that identifies how important a specific word is in the text data. The importance data may represent the importance of each word included in the text data and may be expressed as a term-frequency matrix. The importance data may be expressed by the following Equation 1:

$$T^{[W][R]} \qquad \text{Equation 1}$$

In Equation 1, w denotes the number of words (or terms) and R denotes the number of text data.

The processor 130 may apply topic modelling algorithm to the obtained importance data and obtain a topic model representing a relationship between a topic and a word.

The topic modelling algorithm may refer to a statistical algorithm for discovering an abstract topic (or theme) included in text data. For example, the processor 130 may apply, to the importance data, a latent Dirichlet allocation (LDA) algorithm of a topic modelling algorithm to obtain a topic model. However, the embodiment is not limited thereto and the processor 130 may apply various types of topic modelling algorithms to the importance data to obtain a topic model.

The topic model is data that may represent relationships between words and topics, and may be implemented as a matrix or the like. The topic model may be expressed as Equation 2 below. In Equation 2, w denotes the number of words (or terms), and k denotes the number of topics.

$$H^{[W][k]} \qquad \text{Equation 2}$$

The processor 130 may obtain, based on the obtained topic model, preference data representing the preference of each of the plurality of users for the topic and relationship data representing a relationship between the plurality of items and the topic.

In one embodiment, the processor 130 may group the plurality of text data by users. The processor 130 may group the text data written by the first user among the plurality of text data into one document, and may group the text data written by the second user into one document. The processor 130 may group text data written for each user into one document.

The processor 130 may obtain first frequency data representing the frequency of a word used by each of the plurality of users using the grouped text data. The first frequency data may include information about a frequency of using a specific word by a user.

For example, the processor 130 may obtain first frequency data by applying a TF-IDF algorithm to the grouped text data. The first frequency data may be expressed as Equation 3 below. In Equation 3, w denotes the number of words (or terms), and U denotes the number of users.

$$T_U^{[W]\times[U]} \qquad \text{Equation 3}$$

The processor 130 may perform an operation between the first frequency data and the topic model to obtain preference data. The operation between the first frequency data and the topic model may be expressed as Equation 4. In Equation 4, A refers to preference data, and Tu and H denote a first frequency data and a topic model, respectively.

$$A = T_U * H \qquad \text{Equation 4}$$

As another embodiment, the processor 130 may group a plurality of text data by items. The processor 130 may group the text data for a first item, among the plurality of text data, into one document, and may group the text data for the second item into one document. The processor 130 may group the text data into one document for each item.

The processor 130 may obtain second frequency data corresponding to the item by using the frequency of the word included in the grouped text data. Second frequency data corresponding to the item may include data related to the frequency of use of a particular word on a text associated with a particular item.

For example, the processor 130 may apply the TF-IDF algorithm to the grouped text data to obtain second frequency data corresponding to the item. The second frequency data may be expressed as Equation 5 below. In Equation 5, w denotes the number of words (or terms), and I denotes the number of items.

$$T_I^{[W]\times[I]} \qquad \text{Equation 5}$$

The processor 130 may perform computation between the second frequency data and the topic model to obtain relationship data. The computation between the second frequency data and the topic model may be expressed as Equation 6 below. In Equation 6, B denotes relationship data, $T_I$ and H denote a second frequency data and a topic model, respectively.

$$B = T_I * H \qquad \text{Equation 6}$$

The processor 130 may train a recommendation model to output result data including an expected preference for a plurality of items of a plurality of users based on the preference data and the relationship data.

The processor 130 may set a numerical value included in the preference data to an initial value of a first latent factor included in the recommendation model. The processor 130 may set the value included in the preference data to an initial value of the second latent factor. Accordingly, dimension of each latent factor may refer to a topic.

The processor 130 may train the recommendation model to minimize a difference value between a computation value between an initial value of the first latent factor and an initial value of the second latent factor and a predefined learning value. The predefined learning value may include a preference value given by the user for each item. The trained recommendation model may perform computation between the first latent factor and the second latent factor and may output the result data including the expected preference for the item of the user.

The recommendation model may be trained to perform all or some of the operations performed by the processor 130. For example, the recommendation model may be trained to identify a word of which a word class is noun, among the text data, to obtain importance data.

In the case of a related-art matrix decomposition algorithm, the initial value of the first latent factor and the second latent factor may be set randomly. Respective initial values of the first latent factor and the second latent factor may increase the accuracy of the user's expected preference by setting the preference data representing the preference of each of the plurality of users for the topic and relationship data representing the relationship between the plurality of items and the topic.

The function associated with the artificial intelligence according to the disclosure is operated through the processor 130 and the memory 110. The one or more processors 130 may control the input data to be processed in accordance with predefined operating rules or artificial intelligence models stored in the memory 110.

The predefined operating rule or AI model may be made through learning. Here, being made through learning may refer to a predetermined operating rule or AI model set to perform a desired feature (or purpose) is made by making a basic AI model trained using various training data using a learning algorithm. The learning may be accomplished through a separate server and/or system, but is not limited thereto and may be implemented in an electronic device.

An example of learning algorithm may include supervised learning, unsupervised learning, semi-supervised learning, or reinforcement learning, but the embodiment is not limited thereto.

The AI model may include a plurality of artificial neural networks and the artificial neural networks may be composed of a plurality of layers. Each layer has a plurality of weight values, and performs a layer operation through calculation of a previous layer and an operation of a plurality of weights. A plurality of weights which a plurality of neural network layers have may be optimized by a learning result of the AI model. For example, a plurality of weights may be updated to reduce or minimize a loss value or a cost value obtained in an artificial intelligence model during a learning process.

The artificial neural networks may include deep neural network (DNN) and may include, for example, but is not limited to, a convolutional neural network (CNN), a deep neural network (DNN), a recurrent neural network (RNN), a Restricted Boltzmann Machine Task (RBM), a deep belief network (DBN), a bidirectional deep neural network (BRDNN), and deep Q-networks.

The display 140 may display various information under the control of the processor 130. The display 140 may display result data output by the recommendation model. As another example, the display 140 may indicate a preference value given to a particular item of the first user of the plurality of users.

The display 140 may be implemented with a touch screen along with a touch panel and may be implemented with a flexible display.

The inputter 150 may receive a user input for controlling the electronic device 100. The inputter 150 may include a touch panel for receiving a user touch using a user hand or a stylus pen, a button for receiving a user operation, and the like. The inputter 150 may be implemented as another input device (e.g., a keyboard, a mouse, a motion inputter, etc.).

Figure 2:
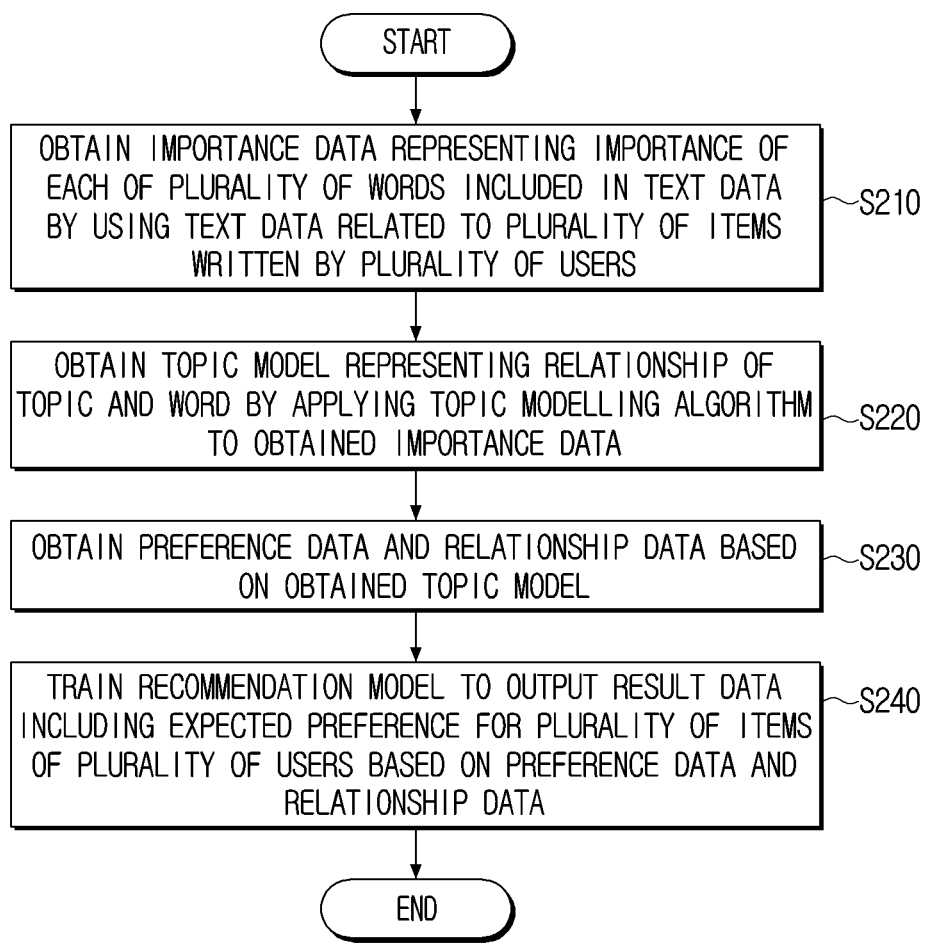
FIG. 2 is a flowchart illustrating a control method of an electronic device according to an embodiment of the disclosure.

FIG. 2 is a flowchart illustrating a control method of an electronic device 100 according to an embodiment of the disclosure.

Referring to FIG. 2, the electronic device 100 may obtain importance data representing an importance of each of a plurality of words included in the text data by using text data related to a plurality of items written by the plurality of users in operation S210.

The electronic device 100 may identify a noun word among a plurality of words included in a plurality of text data and generate the BOW including the identified word.

The electronic device 100 may obtain importance data by applying the TF-IDF algorithm to the generated BOW. The importance data may be implemented in a matrix format, but is not limited thereto and may be implemented in various types of data.

The electronic device 100 may obtain a topic model representing a relationship of a topic and a word by applying a topic modelling algorithm to obtained importance data in operation S220.

The electronic device 100 may obtain relationship data representing a relationship between a plurality of items and topics and preference data representing a preference of each of the plurality of users for the topic, based on the obtained topic model in operation S230.

For example, the electronic device 100 may group a plurality of text data for respective users. The electronic device 100 may group a plurality of text data into one document for respective users. The electronic device 100 may obtain first frequency data indicating the frequency of a word used by each of the plurality of users using the grouped text data. The electronic device 100 may perform a calculation between the first frequency data and the topic model to obtain preference data.

As another embodiment, the electronic device 100 may group the plurality of text data by items and may obtain second frequency data corresponding to the item using frequency of a word included in the grouped text data. To be specific, the electronic device 100 may obtain second frequency data corresponding to the item by applying the TF-IDF algorithm to the grouped text data. The electronic device 100 may obtain the relationship data by performing computation between the second frequency data and the topic model.

The electronic device 100 may train the recommendation model to output the result data including the expected preference for the plurality of items of the plurality of users based on the preference data and the relationship data in operation S240.

For example, the electronic device 100 may set a value included in the preference data to an initial value of a first latent factor. As another example, the electronic device 100 may set a value included in the relationship data to an initial value of a second latent factor. Since the initial value of each latent factor is set to a value included in the preference data and the relationship data, the dimension of the latent factor may mean a topic.

The electronic device 100 may train the recommendation model so that a difference value between a computation value of the initial value of the first latent factor and the initial value of the second latent factor and a pre-defined learning value is minimized. The pre-defined learning value may include a preference value assigned by the actual user to respective items.

Figure 3:
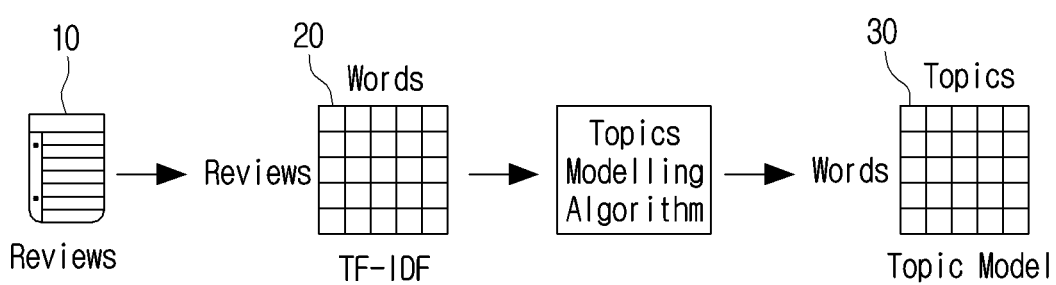
FIG. 3 is a diagram illustrating a process of obtaining a topic model by an electronic device according to an embodiment of the disclosure.
Figure 4:
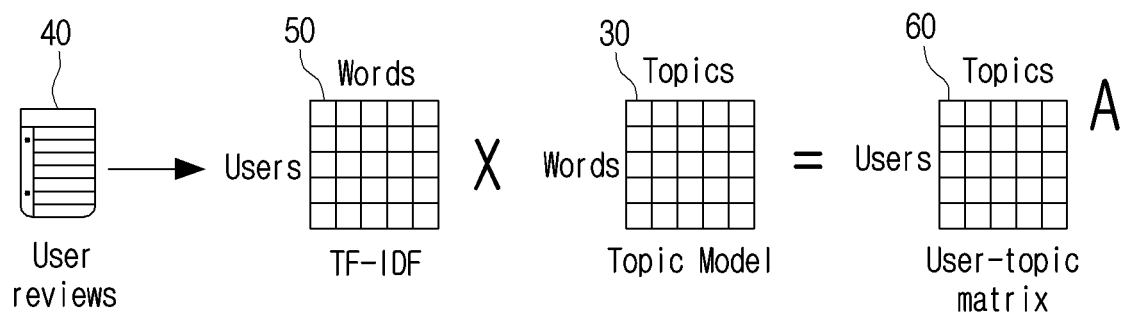
FIG. 4 is a diagram illustrating a process of obtaining preference data by an electronic device according to an embodiment of the disclosure.
Figure 5:
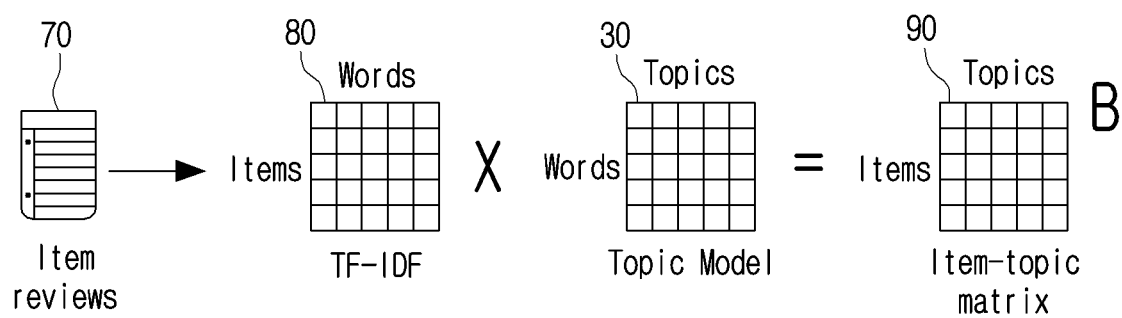
FIG. 5 is a diagram illustrating a process of obtaining relationship data by an electronic device according to an embodiment of the disclosure.

FIGS. 3 to 5 are diagrams illustrating a process of training a recommendation model by the electronic device 100 according to various embodiments of the disclosure.

Referring to FIG. 3, the electronic device 100 may obtain importance data 20 indicating importance of a plurality of words included in the text data using text data (or review data) 10 associated with a plurality of items written by a plurality of users.

As an example, the electronic device 100 may identify words of which a word class is noun, among a plurality of words included in the text data 10. The electronic device 100 may generate a BOW including the identified word, and may apply the TF-IDF algorithm to the generated BOW to obtain the importance data 20. As shown in FIG. 3, the importance data 20 may be implemented in a matrix form, the row of importance data 20 may mean each review data, and a column may mean a word.

The electronic device 100 may apply a topic modelling algorithm to the importance data 20 to obtain a topic model 30. Topic model 30 may represent a relationship between words and topics.

Referring to FIG. 4, the electronic device 100 may obtain reference data 60 and relationship data 90 (See FIG. 5) based on the topic model 30.

The electronic device 100 may group a plurality of text data by users, and may obtain first frequency data 50 indicating the frequency of a word used by each of the plurality of users using the grouped text data 40. The electronic device 100 may perform a computation between the first frequency data 50 and the topic model 30 to obtain preference data (or user-topic matrix) 60.

Referring to FIG. 5, the electronic device 100 may group a plurality of text data for respective items and obtain second frequency data 80 corresponding to the item using the grouped text data 70. The electronic device 100 may perform a computation between the second frequency data 80 and the topic model 30 to obtain relationship data (or item-topic matrix) 90.

The various example embodiments may be implemented with software including instructions stored in the machine-readable storage media readable by a machine (e.g., a computer). A machine is a device which may call instructions from the storage medium and operate according to the called instructions, and may include a server cloud according to the embodiments. When the instructions are executed by a processor, the processor may perform a function corresponding to the instructions directly or by using other components under the control of the processor.

The instructions may include code generated by a compiler or a code executable by an interpreter. A machine-readable storage medium may be provided in the form of a non-transitory storage medium. Herein, the term "non-transitory" denotes that a storage medium does not include a signal but is tangible, and does not distinguish the case in which a data is semi-permanently stored in a storage medium from the case in which a data is temporarily stored in a storage medium. For example, "non-transitory storage medium" may include a buffer in which data is temporarily stored.

According to embodiments, a method disclosed herein may be provided in software of a computer program product. A computer program product may be traded between a seller and a purchaser as a commodity. A computer program product may be distributed in the form of a machine readable storage medium (e.g., CD-ROM) or distributed online through an application store (e.g., PlayStore™). In the case of on-line distribution, at least a portion of the computer program product (e.g., downloadable app) may be stored temporarily in a storage medium such as a manufacturer's server, a server in an application store, or a memory in a relay server.

Further, each of the components (e.g., modules or programs) according to the above-described various embodiments may be composed of one or a plurality of entities, and some subcomponents of the above-mentioned subcomponents may be omitted, or other subcomponents may be further included in various embodiments. Alternatively or additionally, some components (e.g., modules or programs) may be integrated into one entity to perform the same or similar functions performed by each respective component prior to integration. Operations performed by a module, program, or other component, in accordance with various embodiments, may be performed sequentially, in a parallel, repetitive, or heuristically manner, or at least some operations may be performed in a different order, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a memory; and
a processor configured to:
  obtain importance data representing an importance of each of a plurality of words included in text data using text data related to a plurality of items written by a plurality of users,
  obtain a topic model representing a relationship between a topic and a word by applying a topic modelling algorithm to the obtained importance data,
  obtain preference data representing preference of each of the plurality of users for the topic and relationship data representing a relationship between the plurality of items and the topic, based on the obtained topic model, and
  train a recommendation model to output result data including an estimated preference for the plurality of items of the plurality of users, based on the preference data and the relationship data,
wherein the recommendation model comprises a first latent factor and a second latent factor, and
wherein the processor is further configured to:
  set a numeral value included in the preference data as an initial value of the first latent factor,
  set a numeral value included in the relationship data as an initial value of the second latent factor, and
  train the recommendation model so that a difference value between a computation value of the initial value of the first latent factor and the initial value of the second latent factor and a pre-defined learning value is minimized.

2. The electronic device of claim 1, wherein the processor is further configured to:
  identify a noun word among the plurality of words included in the text data,
  generate a bag of words including the identified noun word, and
  obtain the importance data based on the generated bag of words.

3. The electronic device of claim 2, wherein the processor is further configured to obtain the importance data by applying a term frequency-inverse document frequency (TF-IDF) algorithm to the generated bag of words.

4. The electronic device of claim 1, wherein the processor is further configured to:
  group the text data by the plurality of users,
  obtain first frequency data representing a frequency of words used by each of the plurality of users using the grouped text data, and
  obtain the preference data by performing a computation between the first frequency data and the topic model.

5. The electronic device of claim 1, wherein the processor is further configured to:
  group the text data by the plurality of items,
  obtain second frequency data corresponding to the item using a frequency of a word included in the grouped text data, and
  obtain the relationship data by performing computation between the second frequency data and the topic model.

6. The electronic device of claim 1, wherein the recommendation model is further configured to, based on the difference value being minimized, perform computation between the first latent factor and the second latent factor and output the result data.

7. A controlling method of an electronic device, the controlling method comprising:
  obtaining importance data representing an importance of each of a plurality of words included in text data using text data related to a plurality of items written by a plurality of users;
  obtaining a topic model representing a relationship between a topic and a word by applying a topic modelling algorithm to the obtained importance data;
  obtaining preference data representing preference of each of the plurality of users for the topic and relationship data representing a relationship between the plurality of items and the topic, based on the obtained topic model; and
  training a recommendation model to output result data including an estimated preference for the plurality of items of the plurality of users, based on the preference data and the relationship data,
wherein the recommendation model comprises a first latent factor and a second latent factor, and,
wherein the training comprises:
  setting a numeral value included in the preference data as an initial value of the first latent factor;
  setting a numeral value included in the relationship data as an initial value of the second latent factor; and
  training the recommendation model so that a difference value between a computation value of the initial value of the first latent factor and the initial value of the second latent factor and a pre-defined learning value is minimized.

8. The method of claim 7, wherein the obtaining the importance data comprises:
  identifying a noun word among the plurality of words included in the text data;
  generating a bag of words including the identified noun word; and
  obtaining the importance data based on the generated bag of words.

9. The method of claim 8, wherein the obtaining the importance data comprises obtaining the importance data by applying a term frequency-inverse document frequency (TF-IDF) algorithm to the generated bag of words.

10. The method of claim 7, wherein the obtaining the preference data comprises:
  grouping the text data by the plurality of users;
  obtaining first frequency data representing a frequency of words used by each of the plurality of users using the grouped text data; and
  obtaining the preference data by performing a computation between the first frequency data and the topic model.

11. The method of claim 7, wherein the obtaining the relationship data comprises:
  grouping the text data by the plurality of items;

obtaining second frequency data corresponding to the item using frequency of a word included in the grouped text data; and obtaining the relationship data by performing computation between the second frequency data and the topic model.

* * * * *